United States Patent
Costa et al.

(10) Patent No.: US 12,298,553 B2
(45) Date of Patent: May 13, 2025

(54) GRADED-INDEX POLYMER OPTICAL FIBRE AND THE FABRICATION THEREOF

(71) Applicant: Microsoft Technology Licensing, LLC, Redmond, WA (US)

(72) Inventors: Paolo Costa, London (GB); Gilberto Brambilla, Southampton (GB); Kai Shi, Cambridge (GB); Hitesh Ballani, Cambridge (GB); Richard James Baca, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/710,926

(22) Filed: Mar. 31, 2022

(65) Prior Publication Data
US 2023/0314696 A1 Oct. 5, 2023

(51) Int. Cl.
*G02B 6/02* (2006.01)
*G02B 6/036* (2006.01)

(52) U.S. Cl.
CPC ..... *G02B 6/02038* (2013.01); *G02B 6/03633* (2013.01)

(58) Field of Classification Search
None
See application file for complete search history.

(56) References Cited

U.S. PATENT DOCUMENTS

| | | |
|---|---|---|
| 5,557,693 A | 9/1996 | Stevens et al. |
| 5,760,139 A | 6/1998 | Koike et al. |
| 5,783,626 A | 7/1998 | Taylor |

(Continued)

FOREIGN PATENT DOCUMENTS

| | | |
|---|---|---|
| EP | 3848931 A1 | 7/2021 |
| FR | 2761482 A1 | 10/1998 |

(Continued)

OTHER PUBLICATIONS

"Communication channel", Retrieved from: https://en.wikipedia.org/w/index.php?title=Communication_channel&oldid=1042370128, Sep. 4, 2021, 5 Pages.

(Continued)

*Primary Examiner* — Chris H Chu
(74) *Attorney, Agent, or Firm* — Barta Jones, PLLC

(57) ABSTRACT

A method of fabricating a graded-index polymer optical fibre comprises preparing a cladding composition, the cladding composition comprising either a mixture of a cladding polymer and a dopant or a mixture of a cladding polymer precursor and a dopant; forming cladding from the cladding composition around a core, the core comprising a core polymer; and causing diffusion of the dopant into the core such that the dopant has a continuous concentration gradient, according to which concentration gradient the concentration of the dopant increases with radial distance from a centre of the core. The dopant is a compound having a refractive index which is lower than a refractive index of the core polymer. By distributing the dopant such that the dopant concentration is lowest at the centre of the core, the optical attenuation of the graded-index polymer optical fibre may be reduced. Also provided is a graded-index polymer optical fibre obtainable by the method.

11 Claims, 2 Drawing Sheets

(56) References Cited

U.S. PATENT DOCUMENTS

| | | | |
|---|---|---|---|
| 5,783,636 | A | 7/1998 | Koike et al. |
| 6,367,989 | B1 | 4/2002 | Hartman et al. |
| 6,606,175 | B1 | 8/2003 | Sampsell et al. |
| 6,628,874 | B1 | 9/2003 | Sugawara |
| 8,116,606 | B2 | 2/2012 | Sugawara et al. |
| 8,326,105 | B2 | 12/2012 | Imamura |
| 9,052,433 | B2 | 6/2015 | Dianov et al. |
| 9,207,398 | B2 | 12/2015 | Gibson et al. |
| 9,335,467 | B2 | 5/2016 | Kokubun et al. |
| 9,841,556 | B2 | 12/2017 | Butler et al. |
| 9,864,150 | B2 * | 1/2018 | Sasaki ............ G02B 6/3831 |
| 2002/0105102 | A1 | 8/2002 | Blyler et al. |
| 2003/0190130 | A1 | 10/2003 | Welker et al. |
| 2004/0113297 | A1 | 6/2004 | Cho et al. |
| 2004/0208439 | A1 | 10/2004 | Bell et al. |
| 2004/0238977 | A1 | 12/2004 | Ilyashenko |
| 2005/0036731 | A1 | 2/2005 | Maxwell |
| 2005/0041944 | A1 | 2/2005 | Cryan et al. |
| 2005/0157999 | A1 * | 7/2005 | Zhen ............ G02B 6/02038 385/127 |
| 2006/0034613 | A1 | 2/2006 | Morris et al. |
| 2007/0128749 | A1 | 6/2007 | Van et al. |
| 2009/0067793 | A1 | 3/2009 | Bennett et al. |
| 2011/0096570 | A1 | 4/2011 | Vissenberg et al. |
| 2012/0027369 | A1 | 2/2012 | Yoshida et al. |
| 2012/0114291 | A1 * | 5/2012 | Yoshida ............ C08L 33/10 427/162 |
| 2013/0298380 | A1 | 11/2013 | Mukasa |
| 2014/0003776 | A1 | 1/2014 | Gibson et al. |
| 2014/0010501 | A1 * | 1/2014 | Saito ............ G02B 6/02042 156/182 |
| 2014/0199039 | A1 | 7/2014 | Kokubun et al. |
| 2015/0063755 | A1 * | 3/2015 | Doany ............ G02B 6/30 385/59 |
| 2015/0378092 | A1 * | 12/2015 | Bookbinder ............ G02B 6/0281 385/127 |
| 2016/0299289 | A1 * | 10/2016 | Bookbinder ............ C03C 3/06 |
| 2016/0349447 | A1 | 12/2016 | Butler et al. |
| 2017/0205572 | A1 | 7/2017 | Nichol et al. |
| 2018/0051161 | A1 * | 2/2018 | Tam ............ A61B 5/0059 |
| 2019/0101693 | A1 * | 4/2019 | Cao ............ G02B 6/02019 |
| 2020/0209466 | A1 | 7/2020 | Sanborn et al. |
| 2021/0055472 | A1 | 2/2021 | Bretschneider et al. |
| 2021/0271018 | A1 | 9/2021 | White et al. |
| 2023/0121772 | A1 * | 4/2023 | Bennett ............ H01S 3/06716 359/341.1 |
| 2023/0311438 | A1 | 10/2023 | Costa et al. |
| 2023/0314695 | A1 | 10/2023 | Costa et al. |

FOREIGN PATENT DOCUMENTS

| | | | | |
|---|---|---|---|---|
| JP | 2010286548 | A | | 12/2010 |
| JP | 6153447 | B2 | | 6/2017 |
| KR | 20040026766 | A | | 4/2004 |
| WO | 9946619 | A1 | | 9/1999 |
| WO | WO-2016153508 | A1 * | 9/2016 | ............ B22F 3/1035 |

OTHER PUBLICATIONS

"Fiber-optic communication", Retrieved from: https://en.wikipedia.org/w/index.php?title=Fiber-optic_communication&oldid=1043741505, Sep. 11, 2021, 16 Pages.

"Fibre Optic Transmitters", Retrieved from: https://uk.rs-online.com/web/c/displays-optoelectronics/fibre-optic-components/fibre-optic-transmitters/, Retrieved Date: Sep. 21, 2021, 6 Pages.

"Heuristic (computer science)", Retrieved from: https://en.wikipedia.org/w/index.php?title=Heuristic_(computer_science)&oldid=1039350744, Aug. 18, 2021, 4 Pages.

"Multiplexing", Retrieved from: https://en.wikipedia.org/w/index.php?title=Multiplexing&oldid=1039656111, Aug. 19, 2021, 6 Pages.

"Vertical-cavity surface-emitting laser", Retrieved from: https://en.wikipedia.org/w/index.php?title=Vertical-cavity_surface-emitting_laser&oldid=1032729016, Jul. 9, 2021, 6 Pages.

"Wavelength-division multiplexing", Retrieved from: https://en.wikipedia.org/w/index.php?title=Wavelength-division_multiplexing&oldid=1043756516, Sep. 11, 2021, 8 Pages.

"Search Report Issued in European Patent Application No. 21196676.7", Mailed Date: Apr. 4, 2022, 10 Pages.

"Acrylate Polymer", Retrieved from: https://en.wikipedia.org/wiki/Acrylate_polymer, Mar. 2, 2022, 2 Pages.

"Attenuation", Retrieved from: https://en.wikipedia.org/wiki/Attenuation#Optics, Mar. 11, 2022, 8 Pages.

"Borescope", Retrieved from: https://en.wikipedia.org/wiki/Borescope, Sep. 23, 2021, 3 Pages.

"Cladding (Fiber Optics)", Retrieved from: https://en.wikipedia.org/wiki/Cladding_(fiber_optics), Feb. 9, 2022, 3 Pages.

"Modal Dispersion", Retrieved from: https://en.wikipedia.org/wiki/Modal_dispersion, Feb. 6, 2022, 2 Pages.

"Multi-Mode Optical Fiber", Retrieved from: https://en.wikipedia.org/wiki/Multi-mode_optical_fiber, Jan. 31, 2022, 3 Pages.

"Plastic Optical Fiber", Retrieved from: https://en.wikipedia.org/wiki/Plastic_optical_fiber, Feb. 9, 2022, 4 pages.

"Poly(Methyl Methacrylate)", Retrieved from: https://en.wikipedia.org/wiki/Poly(methyl_methacrylate), Mar. 29, 2022, 14 Pages.

"Polycarbonate", Retrieved from: https://en.wikipedia.org/wiki/Polycarbonate, Mar. 4, 2022, 12 Pages.

"Polystyrene", Retrieved from: https://en.wikipedia.org/w/index.php?title=Polystyrene&oldid=1079666750, Mar. 28, 2022, 23 Pages.

"Research Lines", Retrieved from: https://web.archive.org/web/20150331225712/https://www.ehu.eus/en/web/appliedphotonicsbilbao/research-lines, Mar. 31, 2015, 2 Pages.

"Spinning (Polymers)", Retrieved from: https://en.wikipedia.org/wiki/Spinning_(polymers), Mar. 25, 2022, 3 Pages.

"Square-Core Multimode Fiber", Retrieved from: https://web.archive.org/web/20201023122431/https://www.thorlabs.com/newgrouppage9.cfm?objectgroup_id=10637, Oct. 23, 2020, 2 Pages.

"Sumitomo Electric Has Developed Coupled Multi-Core Optical Fiber Suitable for Ultra-Long-Haul Transmission", Retrieved from: https://global-sei.com/company/press/2016/03/prs023.html, Mar. 25, 2016, 2 Pages.

"Toslink", Retrieved from: https://en.wikipedia.org/wiki/TOSLINK, Mar. 24, 2022, 4 Pages.

Abe, et al., "Multi-Core Fiber Connector Technology for Low-Loss Physical-Contact Connection", In Journal of NTT Technical Review, vol. 15, Issue 6, Jun. 2017, 6 Pages.

Anuszkiewicz, et al., "Fused Silica Optical Fibers with Graded Index Nanostructured Core", In Journal of Scientific Reports, vol. 8, Issue 1, Aug. 17, 2018, 13 Pages.

Bhowmik, et al., "Polymer Optical Fibers", In Handbook of Optical Fibers, Mar. 2019, 51 Pages.

Fasano, et al., "Fabrication and Characterization of Polycarbonate Microstructured Polymer Optical Fibers for High-Temperature-Resistant Fiber Bragg Grating Strain Sensors", In Journal of Optical Materials Express, vol. 6, Issue 2, Jan. 27, 2016, 11 Pages.

Ishigure, et al., "Optimum Refractive-Index Profile of the Graded-Index Polymer Optical Fiber, Toward Gigabit Data Links", In Journal of Applied Optics, vol. 35, Issue 12, Apr. 20, 1996, pp. 2048-2053.

Jung, et al., "High Spatial Density 6-Mode 7-Core Fiber Amplifier for L-band Operation", In Journal of Lightwave Technology, vol. 38, Issue 11, Jun. 1, 2020, pp. 2938-2943.

Narro-Garcia, et al., "Polymer Optical Fiber with Rhodamine Doped Cladding for Fiber Light Systems", In Journal of Luminescence, vol. 169, Part A, Jan. 2016, pp. 295-300.

Paschotta, Rudiger, "Double-clad Fibers", Retrieved from: https://web.archive.org/web/20220111005727/https://www.rp-photonics.com/double_clad_fibers.html, Jan. 11, 2022, 10 Pages.

Paschotta, Rudiger, "Fiber Preforms", Retrieved from: https://web.archive.org/web/20211031034456/http://www.rp-photonics.com/fiber_preforms.html, Oct. 31, 2021, 7 Pages.

Stajanca, et al., "Solution-Mediated Cladding Doping of Commercial Polymer Optical Fibers", In Journal of Optical Fiber Technology, vol. 41, Mar. 1, 2018, pp. 227-234.

Weber, Austin, "Positioning for Fiber Optics Assembly", Retrieved from: https://www.assemblymag.com/articles/83597-positioning-for-fiber-optics-assembly, May 1, 2001, 9 Pages.

(56) References Cited

OTHER PUBLICATIONS

Zafeiropoulou, et al., "Curvature Sensing with a D-Shaped Multicore Fibre and Brillouin Optical Time-Domain Reflectometry", In Journal of Optics Express, vol. 28, Issue 2, Jan. 20, 2020, pp. 1291-1299.
Zafeiropoulou, et al., "D-Shaped Multicore Fibre for Distributed Curvature Sensing with BOTDR", In Proceedings of Optical Sensors and Sensing Congress, Jun. 22, 2020, 2 Pages.
Zafeiropoulou, et al., "Flat Multi-Core Fibre for Twist Elimination in Distributed Curvature Sensing", In Journal of Optical Fiber Technology, vol. 66, Oct. 2021, 6 Pages.
"Application as Filed in European Patent Application No. 21196676.7", Filed Date: Sep. 14, 2021, 26 Pages.
"International Search Report and Written Opinion Issued in PCT Application No. PCT/US2023/013176", Mailed Date: Jun. 22, 2023, 12 Pages.
"Office Action issued in U.S. Appl. No. 17/710,961", Mailed Date: Mar. 24, 2023, 10 Pages.
"Non Final Office Action Issued in U.S. Appl. No. 17/710,952", Mailed Date: Mar. 3, 2023, 13 Pages.
"Applicant Initiated Interview Summary Issued in U.S. Appl. No. 17/710,952", Mailed Date: Apr. 19, 2023, 5 Pages.
"International Search Report and Written Opinion Issued in PCT Application No. PCT/US23/013175", Mailed Date: May 19, 2023, 14 Pages.
"International Search Report and Written Opinion Issued in PCT Application No. PCT/US23/010882", Mailed Date: May 9, 2023, 12 Pages.
"Notice of Allowance Issued in U.S. Appl. No. 17/710,952", Mailed Date: Aug. 4, 2023, 10 Pages.
"Final Office Action Issued In U.S. Appl. No. 17/710,961", Mailed Date: Sep. 6, 2023, 11 Pages.
Final Office Action mailed on May 14, 2024, in U.S. Appl. No. 17/710,961, 9 pages.
Non-Final Office Action mailed on Dec. 29, 2023, in U.S. Appl. No. 17/710,961, 11 pages.
Notice of Allowance mailed on Feb. 12, 2024, in U.S. Appl. No. 17/710,952, 8 pages.

\* cited by examiner

GRADED-INDEX POLYMER OPTICAL FIBRE AND THE FABRICATION THEREOF

BACKGROUND

An optical fibre comprises a core surrounded by cladding. In refractive index guiding fibres, the core has a refractive index which is greater than that of cladding. The optical fibre thus acts as a waveguide, with light being confined to the core by total internal reflection.

The core and cladding each comprise optically transparent materials, generally silicates or an organic polymer such as poly(methyl methacrylate) ("PMMA"). An optical fibre in which the cladding and the core are both formed from organic polymers are referred to as "polymer optical fibres", often abbreviated as "POF". POFs may be cheaper to manufacture than silica-based optical fibres, and may be less fragile and easier to handle.

The boundary between the core and cladding may be an abrupt material boundary. Optical fibres with an abrupt boundary between the core and cladding are referred to as "step-index optical fibres". Alternatively, the transition between the core and the cladding may be more gradual. Optical fibres with a gradual transition between the core and the cladding are referred to as "graded-index optical fibres".

Optical fibres are widely used in communications systems. Data may be encoded in pulses of light which are transmitted along the optical fibres. Fibre-optic communication systems are used in a variety of contexts to transfer information, such as for telephone and internet communication, as well as for broadcasting television signals. Fibre optic communication systems are also widely used for intra-datacentre connectivity, where emerging workloads such as machine learning and resource disaggregation are significantly increasing network demands.

Optical fibres are also used in optical instruments, e.g. in boroscopes (also referred to as borescopes or fibrescopes) and endoscopes. These instruments make use of optical fibres to allow visual inspection of otherwise-inaccessible targets.

SUMMARY

In one aspect, there is provided a method of fabricating a graded-index polymer optical fibre. The method comprises preparing a cladding composition, the cladding composition comprising either a mixture of a cladding polymer and a dopant or a mixture of a cladding polymer precursor and a dopant; forming cladding from the cladding composition around a core, the core comprising a core polymer; and causing diffusion of the dopant into the core such that the dopant has a continuous concentration gradient, according to which concentration gradient the concentration of the dopant increases with radial distance from a centre of the core. The dopant is a compound having a refractive index which is lower than a refractive index of the core polymer. In use, light is transmitted through the fibre. Most of the light interacts with the core, and comparatively little light interacts with the outer regions of the cladding. Dopants may contribute to optical attenuation. By distributing the dopant such that the dopant concentration is lowest at the centre of the core, the optical attenuation of the graded-index polymer optical fibre may be reduced.

In another aspect, there is provided a graded-index polymer optical fibre. The graded-index polymer optical fibre comprises a core having a centre, the core comprising a core polymer; cladding surrounding the core, the cladding comprising a cladding polymer; and a dopant distributed in the core and the cladding, the dopant being a compound having a refractive index which is lower than a refractive index of the core polymer. The dopant is distributed on a continuous concentration gradient, according to which concentration gradient the concentration of the dopant increasing with distance from the centre of the core. The graded-index polymer optical fibre may be obtainable by the method of the first aspect. The graded-index polymer optical fibre may have low optical attenuation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION

Figure 1:
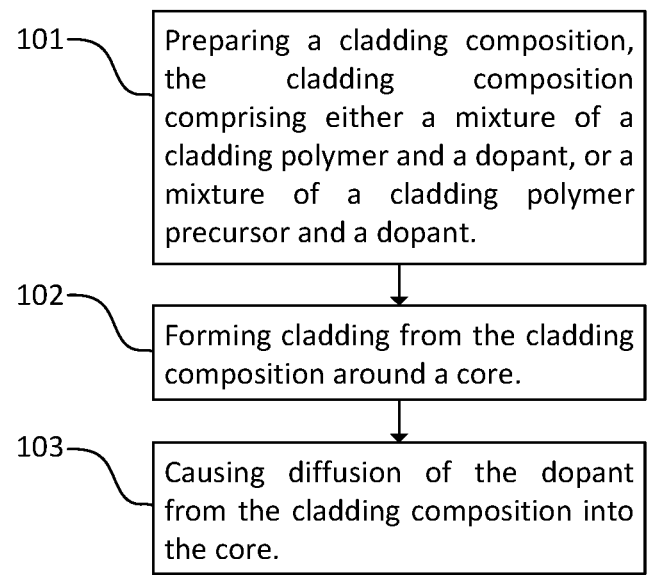
FIG. 1 is a flow diagram outlining a method of fabricating a graded-index polymer optical fibre.

The verb 'to comprise' is used herein as shorthand for 'to include or to consist of'. In other words, although the verb 'to comprise' is intended to be an open term, the replacement of this term with the closed term 'to consist of' is explicitly contemplated, particularly where used in connection with chemical compositions.

Directional terms such as "top", "bottom", "left", "right", "above", "below", "horizontal" and "vertical" are used herein for convenience of description and relate to the orientation illustrated in the relevant FIG. of the drawings. For the avoidance of any doubt, this terminology is not intended to limit orientation in an external frame of reference.

Geometrical terms such as "triangular", "square", and "hexagonal", are used herein for convenience of description. As will be appreciated, shapes of components may vary within manufacturing tolerances.

All "cross-sections" are taken perpendicular to the length of the direction of the optical fibre or optical fibre preform, unless otherwise stated. The length direction is the direction in which the optical fibre preforms will be drawn, and in which light will propagate along the optical fibre.

For optical fibres which are not circular, the "centre" is taken to be the geometric centre (also referred to as a "centroid") when viewed in cross-section, and the "radius" is taken to be the longest straight line from the centre to the outer edge of the cladding.

The term "polymer" is used herein as shorthand for "organic polymer". Silicates are not considered to be polymers in the present context.

Attenuation, also referred to as transmission loss, is the reduction in intensity of a light beam as a function of distance travelled through the optical fibre. In a fibre optic communication system, attenuation constrains the maximum length of the optical fibre, the minimum transmitter power, and the minimum detector sensitivity.

In graded refractive index ("GRIN") optical fibres, the refractive index varies with radial position within the fibre. Often, the refractive index varies quadratically with radial position.

In a conventional process, GRIN optical fibres are manufactured by doping the core with a dopant which diffuses into the cladding during processing. Core dopants used commercially include nanoparticles or molecules with refractive indices higher than that of the bulk core material. The rate of diffusion may vary depending on numerous factors, such as the dopant size, the temperature at which processing is performed, and the time spent at the processing temperature.

In the methods provided herein, the cladding is doped with a dopant having a refractive index lower than that of the bulk core material. The dopant migrates into the core during processing to produce a graded refractive index. The effect of the dopant on the refractive index of the core depends upon the concentration of the dopant. The greatest reduction in reactive index is obtained at the interface between core and cladding, with the reduction becoming progressively smaller toward the centre of the core.

The cladding material may for example comprise a fluorinated polymer doped with a fluorinated oligomer or fluorinated small molecule. During fabrication of the fibre, or after forming the fibre, a fraction of the dopant diffuses into the core to provide the graded refractive index profile. The diffusion may be caused by heating the fibre.

Causing diffusion of a dopant from the core to the cladding may be particularly useful for the manufacture of fibres having cores made of a pure polymer. Attenuation depends on the material purity, thus pure polymers are used for the core when propagation attenuation is to be minimised.

The methods described herein may be implemented as continuous processes, in which an optical fibre is manufactured from raw materials; or discontinuous processes, in which the optical fibre is manufactured from a preform.

An example method of fabricating a graded-index polymer optical fibre will now be described with reference to FIG. 1. FIG. 1 is a flow diagram outlining the method.

At block 101, a cladding composition comprising either a mixture of a cladding polymer and a dopant or a mixture of a cladding polymer precursor and a dopant is prepared. This composition will subsequently be used to form the cladding of the optical fibre.

By "cladding polymer precursor" is meant one or more reagents capable of reacting to form a cladding polymer during fabrication of the optical fibre. For example, the cladding polymer precursor may comprise monomers which are later polymerized. Polymerization may occur, for example, on exposure to heat; radiation, such as ultraviolet light; and/or by contact with one or more appropriate further reagents, e.g. an initiator.

The mixture may be prepared by any suitable technique. For example, preparing the composition may comprising melting the cladding polymer or cladding polymer precursor and the dopant, and mixing the melts. Preparing the composition may comprise preparing a solution comprising the cladding polymer or the cladding polymer precursor and the dopant in an appropriate solvent.

The nature of the cladding polymer is not particularly limited and may be selected as appropriate. The cladding polymer is an organic polymer, typically an organic thermoplastic polymer. A cladding polymer which is transparent to the wavelength(s) of light to be transmitted along the optical fibre is selected.

The cladding polymer may comprise a halogenated polymer, in particular a fluoropolymer or chloropolymer. Halogenated polymers often have a lower refractive indices than their unsubstituted analogues, with fluoro substituents typically having a greater effect on refractive index than chloro substituents. A wide variety of halogenated polymers may be used. Illustrative examples include poly(fluoroalkyl methacrylate), poly(perfluoro-butenylvinyl ether) and poly(vinylidene fluoride).

The dopant may be any species which has a refractive index which is lower than that of the chosen core material, and which is capable of diffusing into the core during fabrication of the optical fibre.

The dopant may be a fluorinated or chlorinated molecule having a molecular weight of less than or equal to 5,000 Da, optionally less than or equal to 2,500 Da, and further optionally less than or equal to 500 Da.

The dopant may be an oligomer, in particular a halogenated oligomer such as a fluorinated oligomer or chlorinated oligomer. As used herein, the term "oligomer" refers to a short-chain polymer, having a chain length selected to allow the oligomer to diffuse into the core. An oligomer typically comprises from 2 to 10 monomer units. Larger oligomers, with chain lengths of up to, for example, 25 monomer units, may be used in some implementations.

Illustrative examples of suitable dopants include compounds of Formula 1:

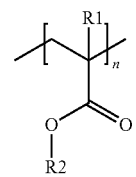

Formula 1 where:
n is from 1 to 20;
R1 is selected from H, unsubstituted methyl, and halomethyl;
R2 is selected from:
  hydroxyl;
  unsubstituted phenyl;
  substituted phenyl bearing at least one substituent selected from F, Cl,
  unsubstituted C1 to C3 alkyl, and C1 to C3 haloalkyl;
  unsubstituted C1 to C10 alkyl;
  C1 to C10 haloalkyl;
  C1 to C10 alkyl amine; and
  C1 to C10 haloalkyl amine;
with the proviso that the dopant includes at least one F or Cl substituent.

By "haloalkyl" is meant an alkyl group bearing from one to 2x+1 halo substituents, where x is the number of carbon atoms in the alkyl group. For example, a halomethyl group includes at least one halo substituent, and may have up to three halo substituents. The halo substituents may be selected from F and Cl. The halo substituent(s) are preferably fluoro substituent(s). F may have a larger effect on the refractive index of the dopant than C1. Perfluorinated alkyl groups (i.e., alkyl groups substituted with 2x+1 F substituents) may be particularly preferred.

Alkyl and haloalkyl groups may be linear. Alkyl and haloalkyl groups including three or more carbon atoms may be linear or branched.

Alkyl amine and haloalkyl amines may be primary, secondary, or tertiary amines. Amines may be ionisable. Ionisable amines are typically in free base form, but may alternatively be in the form of a salt with any appropriate counterion.

R1 may be H or unsubstituted methyl.

R2 may be selected from:
substituted phenyl bearing at least one substituent selected from F, Cl, unsubstituted C1 to C3 alkyl, and C1 to C3 haloalkyl; and
C1 to C10 haloalkyl.

The dopant of Formula 1 may be a small molecule. In a small molecule, n is 1.

Alternatively, the dopant of Formula 1 may be an oligomer. In an oligomer, n is at least 2. Particularly preferably, n may be in the range 2 to 10.

The oligomer may be a homo-oligomer or a co-oligomer. A co-oligomer comprises two or more different units of Formula 1. In other words, when n is at least 2, each R1 and R2 group may be independently selected.

Illustrative examples of useful homo-oligomer dopants include fluorinated alkyl (meth)acrylate oligomers and fluorinated aryl (meth)acrylate oligomers, such as oligo(trifluoroethyl methacrylate), oligo(pentafluoropropyl methacrylate), oligo(heptafluorobutyl methacrylate), (tetrafluoropropyl methacrylate), oligo(trifluoropropyl methacrylate), oligo(hexafluorobutyl methacrylate), oligo(pentafluorobutyl methacrylate), oligo (methyl 2-trifluoromethylacrylate), and oligo(pentafluorophenyl acrylate). In particular, these oligomers may comprise 2 to 10 monomer units.

A co-oligomer may, for example, comprise at least one (meth)acrylate unit (R1=H or unsubstituted methyl; R2=hydroxyl), and at least one halogenated unit. The halogenated unit may be a fluorinated alkyl (meth)acrylate or a fluorinated aryl (meth)acrylate. A co-oligomers of a (meth) acrylate and a halogenated acrylate may have refractive indices higher than a homo-oligomer of the halogenated unit.

Still another class of co-oligomers comprises an aminated meth(acrylate) unit (R1=H or unsubstituted methyl; R2=C1 to C10 alkyl amine), and at least one fluorinated alkyl (meth)acrylate unit (R1=H or unsubstituted methyl; R2=C1 to C10 haloalkyl group including at least one F substituent). An example oligomer in this class comprises (2-dimethylamino) ethylmethacrylate units and trifluoroethyl methacrylate units.

The co-oligomer may be an A-B block co-oligomers of methacrylate and halogenated monomers.

Oligomers of Formula 1 are acrylate oligomers. Other classes of oligomers may be used. For example, the oligomer may be a halogenated polypropylene oxide, such as oligo(3-(perfluoro-7-methyloctyl-1,2-propene oxide). Monomeric 3-(perfluoro-7-methyloctyl-1,2-propene oxide may alternatively be used as a small molecule dopant.

The dopant may be a small molecule, in particular a halogenated small molecule such as a fluorinated small molecule. A "small molecule" is an organic compound having a molecular weight of less than or equal to 1,000 Da and which is not a polymer or oligomer. Example small molecules include compounds of Formula 1 where n=1.

Subsequently, at block 102, cladding is formed around a core using the cladding composition.

In implementations where the cladding composition includes the cladding polymer precursor, the operations of this block include reacting the cladding polymer precursor to form the cladding polymer in situ.

The core comprises a core polymer, which may be any organic polymer suitable for use as a core of an optical fibre. The core polymer may be a thermoplastic.

The core polymer may, for example, be selected from polyacrylates, such as poly(methyl methacrylate); polyethylene; polystyrenes; polycarbonates; poly(perfluorobutylene vinyl ether); and cyclic olefin copolymers.

The core polymer may be the same as the cladding polymer. The dopant may provide the difference in refractive indices between the core and the cladding.

At this stage, the core may be undoped. In other words, the core may consist of the core polymer. Starting with an undoped polymer core may reduce costs. Undoped core materials (e.g., PMMA) are generally less expensive than doped core materials.

The core may be prepared in advance. Alternatively, the core and cladding may be formed from respective precursors, e.g. in a wet spinning process.

The core polymer is desirably as pure as possible. For example, the core polymer may comprise no more than 0.1% of contaminants or impurities, by weight of the core polymer. Optionally, the core polymer may comprise no more than 100 ppm, no more than 10 ppm, or no more than 1 ppm of contaminants or impurities, by weight based on the weight of the core polymer.

Both continuous and discontinuous processes for fabricating optical fibres are contemplated herein.

In a discontinuous implementation, surrounding the core with the cladding comprises manufacturing an optical fibre preform. The optical fibre is then subsequently formed by fibre drawing of the preform, e.g. by thermal fibre drawing. The process is discontinuous in the sense that the manufacture of the preform and the fibre drawing may be performed at different times, and using different apparatuses. The preform may be processed, stored, and/or transported after manufacture and before fibre drawing.

An optical fibre preform is an intermediate product. An optical fibre preform comprises a core and cladding surrounding the core. An optical fibre preform has a thickness which is greater than that of a finished optical fibre, and a length which is less than that of a finished optical fibre. By way of illustration, an optical fibre preform may have a thickness of greater than or equal to 2 cm, e.g. 2 to 30 cm, and a length of less than 500 cm, e.g. 30 to 500 cm. In contrast, an optical fibre may have a thickness of less than or equal to 2 mm and a length of 1 m or more.

Optical fibre preforms may be manufactured by any appropriate technique. Illustrative examples include co-extrusion; rod-in-tube processes; 3D printing; moulding; and interfacial polymerization of cladding material around a core.

In a continuous implementation, the optical fibre is manufactured without first preparing a preform. Surrounding the core with the cladding composition occurs during fabrication of the optical fibre. Continuous processes may allow the optical fibre to be manufactured rapidly.

Examples of continuous processes useful for fabricating optical fibres include wet-spinning, melt-spinning, dry spinning, co-extrusion, and interfacial polymerization of cladding material around a core At block 103, the dopant is caused to defuse from the cladding composition into the core. This creates a continuous concentration gradient of the dopant in the core and cladding. The concentration of dopant is at a maximum in the cladding, and falls to a minimum at the centre of the core. The centre of the core may be substantially free of dopant.

Causing the diffusion may comprise heating the core and cladding to an elevated temperature at which the core and cladding soften. The core and cladding are maintained at the elevated temperature for a period of time to generate the concentration gradient. The core and cladding are then cooled to cause them to solidify, thereby stopping the diffusion and preventing the concentration of dopant from equilibrating. The extent to which the dopant diffuses may be controlled by varying the temperature and/or the duration of the period of time.

In discontinuous fabrication processes, diffusion generally occurs after manufacturing the preform, and typically during and/or after fibre drawing. In implementations where the optical fibre preform is drawn by thermal fibre drawing, heating the optical fibre preform during the thermal fibre drawing may cause the diffusion.

Causing diffusion by heating the optical fibre after drawing is also contemplated.

Causing diffusion before drawing the preform into a fibre is also possible, though the distances over which the dopant would travel would be significantly larger.

In continuous fabrication processes, diffusion may occur during and/or after manufacture of the optical fibre.

Diffusion may be caused after manufacturing the optical fibre by heating the optical fibre, similar to in discontinuous processes.

In implementations where the cladding is formed from a precursor, diffusion of the dopant may occur during the formation of the cladding polymer. For example, the cladding precursor composition may be in the form of a solution. The solution may be contacted with the core, resulting in diffusion of the dopant from the solution into the core. At the same time, polymerization of the cladding precursor to form the cladding polymer may occur.

Diffusion of the dopant during formation of the cladding polymer may take place during continuous manufacturing processes, such as wet spinning.

Figure 2:
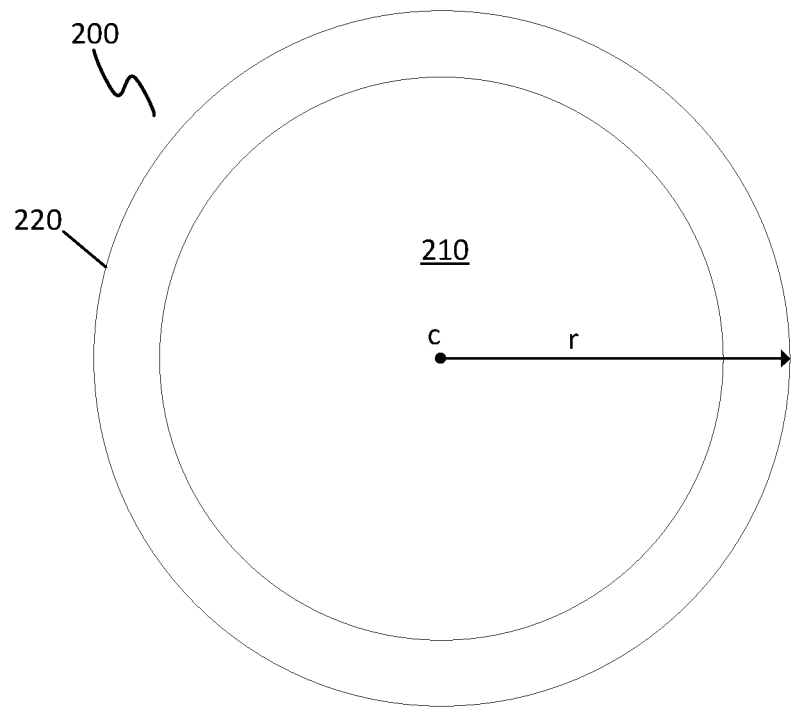
FIG. 2 is a schematic cross-section of an example graded-index polymer optical fibre.
Figure 3:
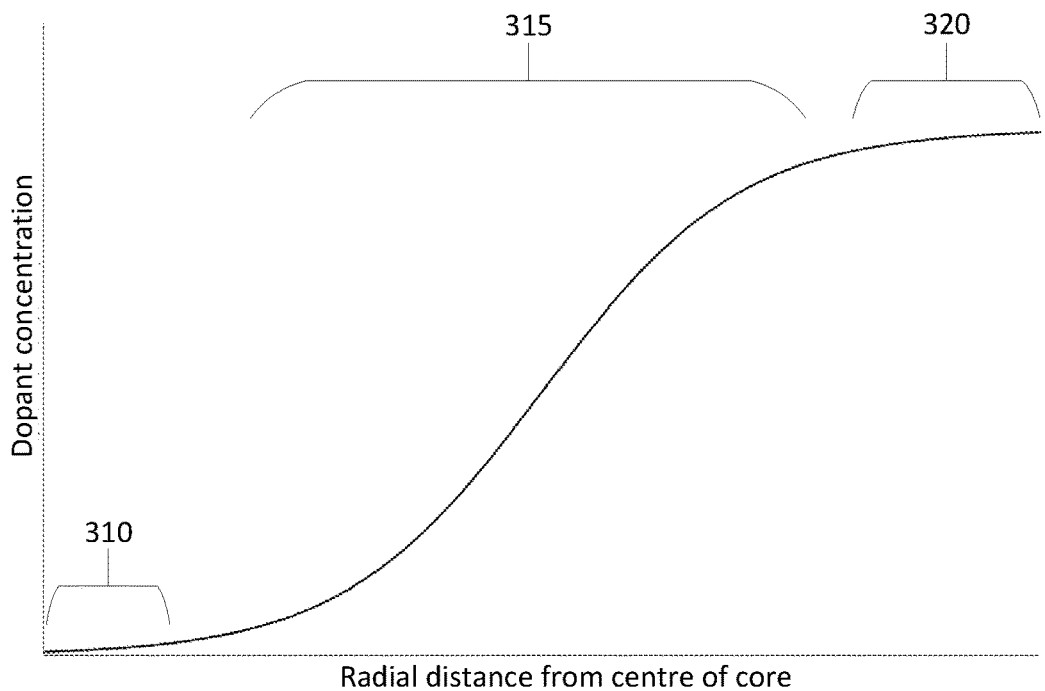
FIG. 3 is a plot illustrating dopant concentration as a function of position along line r of FIG. 2.

An example graded-index polymer optical fibre 200 obtainable by the method will now be described with reference to FIGS. 2 and 3. FIG. 2 is a schematic cross-section of the graded-index polymer optical fibre. FIG. 3 is a plot illustrating dopant concentration as a function of radial position in the graded-index polymer optical fibre.

The graded-index polymer optical fibre 200 comprises a core 210 with cladding 220 surrounding the core 210. The core 210 and the cladding 220 have concentric circular cross-sections. The graded-index polymer optical fibre 200 has a centre c and radius r.

The core 210 and cladding 220 comprise respective polymers, as previously described with reference to FIG. 1. A dopant is distributed in the core and cladding. The distribution of the dopant along the radius r is illustrated in FIG. 3.

FIG. 3 shows that in a central region 310, i.e. a region closest to the centre c of core 210, the concentration of the dopant is approximately zero. In this region, the core may consist of the core polymer.

In an outer region 320 at the outer edge of the cladding 220 and furthest from the centre of the core, the concentration of the dopant is at a maximum value. This maximum value may be approximately equal to the concentration of the dopant in the cladding composition prepared at block 101 of FIG. 1.

In an intermediate region 315 between central region 310 and outer region 320, the concentration of the dopant increases with increasing distance from the centre of the core. For example, the concentration of the dopant may follow a parabolic distribution, increasing quadratically with distance from the centre of the core.

The decrease in refractive index caused by the dopant at any given position is proportional to the concentration of the dopant. Thus, the refractive index of the core is greatest at its centre, and reduces with increasing distance from the core. The polymer optical fibre thus has a graded index.

Although useful for varying the refractive index, the presence of the dopant also increases the attenuation of the material. In the example optical fibre, attenuation due to the dopant is greatest toward the outer edges of the optical fibre, and is minimised at the centre of the core.

It is the properties of the core that make the greatest contribution to the optical properties of the optical fibre as a whole. The vast majority of the light transmitted through the fibre passes through the core. Comparatively little light reaches the outer parts of the cladding.

A comparative graded-index optical fibre may be fabricated by doping a core with a material which increases refractive index, surrounding the doped core with undoped cladding, and then causing diffusion of the dopant from the core into the cladding. The comparative graded-index optical fibre would attenuate light signals more strongly, because dopant would be present at high concentrations throughout the core.

Various modifications may be made to the illustrated graded-index optical fibre.

The example optical fibre has a circular core. Other core shapes are possible.

Optical fibres including additional components are contemplated. For example, the optical fibre may be surrounded by a protective jacket.

Figure 4:
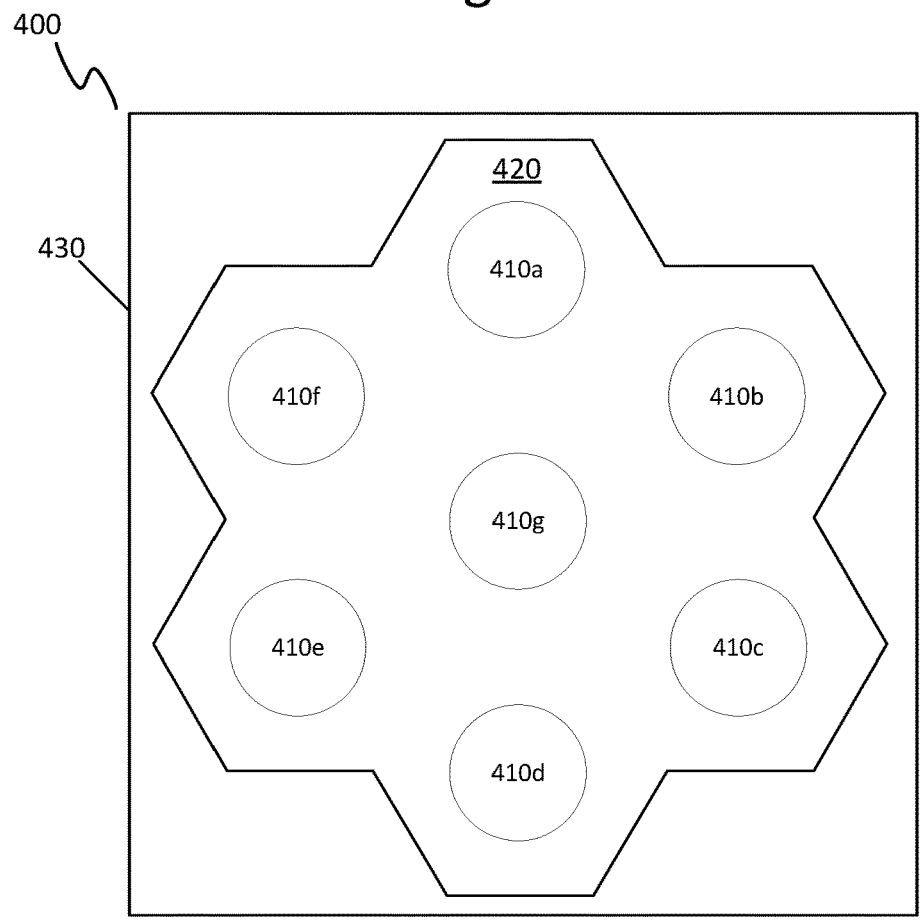
FIG. 4 is a schematic cross-section of an example multi-core graded-index polymer optical fibre.

The example optical fibre has a single core. The methods provided herein may be adapted to allow the production of multi-core polymer optical fibres. An example multi-core polymer optical fibre 400 is illustrated in FIG. 4, which shows a schematic cross-section of the multi-core polymer optical fibre.

A "multi-core" optical fibre is an optical fibre including at least two cores. The cores may be embedded in a single, unitary portion of cladding. The illustrated example has seven cores 410a ... 410g embedded in a continuous portion of cladding 420. The cladding 420 is surrounded by a jacket 430. The jacket 430 is an optional component which provides physical protection for the cores 410 and cladding 420.

When a multi-core optical fibre is connected to a device, the cores of the optical fibre must be aligned with the transmitters/receivers of the device. To achieve this, the optical fibre must be correctly positioned in the horizontal and vertical directions and must have the correct rotational orientation.

In the illustrated example, the multi-core polymer optical fibre 400 has a rectangular outer cross-section. A rectangle has rotational symmetry of order 2. By configuring the outer cross-section of the optical fibre to have a shape with a low order of rotational symmetry, e.g. an order of rotational symmetry in the range 1 to 4, rotational alignment of the multi-core optical fibre may be made easier. This may allow the multi-core optical fibre to be installed without necessarily requiring the use of an active alignment procedure.

A multi-core polymer optical fibre may be fabricated in a discontinuous process by stacking a plurality of optical fibre preforms, and then drawing and bonding the stack. Drawing and bonding the stack may comprise heating the stack to soften the cores and the cladding, and tensioning the softened stack. This stretches the preforms, increasing their length while reducing their thickness. At the same time, adjacent preforms are forced towards one another. Since the cladding is in a softened state, adjacent preforms become fusion bonded. This yields a multi-core polymer optical fibre having a plurality of cores held together by a unitary portion of cladding material.

The optical fibre preforms may have a tileable shape when viewed end-on. When viewed in a cross-section taken perpendicular to the length direction of the core, the outermost edges of the optical fibre preform may form a tileable shape. In other words, the cladding may have a stackable outer geometry. This may allow the optical fibre preforms to be stacked together more easily, as well as allowing for repeatable positioning of the cores. Multi-core optical fibres where the cores are arranged at predictable, predetermined locations may be easier to install.

A "tileable" shape is a polygonal shape which allows the preforms to be stacked together without gaps between preforms in the stack. In other words, a tileable shape is a shape which tessellates. Illustrative examples of tileable shapes include triangles, squares, rectangles, and hexagons. The tileable shape may be a tileable regular polygon, e.g. a square, equilateral triangle, or regular hexagon.

The surfaces of the optical fibre preforms may collect particulate matter, e.g. dust or dirt, before the drawing and bonding process. In the finished multi-core optical fibre, the portion of the cladding which is immediately adjacent to the cores may be substantially free of the particulate matter, with the particulate matter being concentrated far away from the cores, at the locations of the former boundaries between the preforms. Consequently, the particulate matter has very little impact on signals passing through a core. However, light passing between cores, e.g. from core 312a to core 312b, is attenuated by the particulate matter. The particulate matter thus reduces crosstalk between adjacent signal paths.

Causing diffusion of a dopant in a multi-core optical fibre may be achieved as described for a single core optical fibre with reference to block 103 of FIG. 1. Diffusion of the dopant may occur during the drawing and bonding, and/or in a subsequent heating step, as previously described with reference to FIG. 3.

Particulate matter will diffuse very slowly in comparison with a dopant: the mass of a particulate particulates will be many orders of magnitude greater than that of a dopant molecule. Causing diffusion of the dopant will therefore typically have very little effect on the distribution of any particulate matter that may be present.

Continuous manufacturing of multi-core optical fibres, for example by extrusion, is also contemplated.

It will be appreciated that the above embodiments have been described by way of example only.

More generally, according to one aspect disclosed herein, there is provided a method of fabricating a graded-index polymer optical fibre. The method comprises preparing a cladding composition, the cladding composition comprising either a mixture of a cladding polymer and a dopant or a mixture of a cladding polymer precursor and a dopant; forming cladding from the cladding composition around a core, the core comprising a core polymer; and causing diffusion of the dopant into the core such that the dopant has a continuous concentration gradient, according to which concentration gradient the concentration of the dopant increases with radial distance from a centre of the core. The dopant is a compound having a refractive index which is lower than a refractive index of the core polymer.

The dopant may be a fluorinated or chlorinated organic molecule having a molecular weight of less than or equal to 5,000 Da, optionally less than or equal to 2,500 Da, and further optionally less than or equal to 500 Da.

The dopant may be a compound of Formula 1 as defined hereinabove.

The core polymer may be selected from polyacrylates, such as poly(methyl methacrylate); polystyrenes; polyethylenes; polycarbonates; poly(perfluorobutylene vinyl ether); and cyclic olefin copolymers.

The cladding polymer may, for example, be selected from poly(perfluoro-butenylvinyl ether), poly(fluoroalkyl methacrylate), and poly(vinylidene fluoride).

Before the diffusion, the core may consist of the core polymer. This may allow an optical fibre having a core which comprises a central region and an outer region surrounding the central region to be obtained. The central region may consist of the core polymer. The outer region may comprise the core polymer and the dopant. Dopants may attenuate light. Providing a core which has a region free of the dopant may reduce the attenuation of the optical fibre.

Causing the diffusion of the dopant may comprise heating the cladding composition and the core. The heating is performed after surrounding the core with the cladding composition. The extent to which the dopant diffuses may be controlled by varying the temperature to which the core and cladding are heated, and/or by varying the duration for which the core and cladding are held at the temperature.

Surrounding the core with the cladding may comprise co-extrusion of the core polymer and the cladding composition. The co-extrusion may be continuous and may form the optical fibre. Alternatively, the co-extrusion may form an optical fibre preform, and the optical fibre preform may then be drawn to form the optical fibre.

Surrounding the core with the cladding composition may comprise forming an optical fibre preform. In such implementations, the method may further comprise drawing the optical fibre preform.

When the cladding composition comprises a mixture of a cladding polymer precursor and a dopant, forming cladding from the cladding composition around the core includes reacting the cladding polymer precursor to form a cladding polymer. The mixture may be a solution, further comprising a solvent. The cladding polymer precursor may comprise monomers or a mixture of different monomers. The reaction is typically a polymerization reaction. The diffusion of the dopant into the core may be caused by contacting the mixture of a cladding polymer precursor and the dopant with the core. The contacting may occur during a wet spinning process.

The method may be used to fabricate a single-core graded index optical fibre. Alternatively, the method may be used to fabricate a multi-core graded-index polymer optical fibre.

A multi-core graded-index polymer optical fibre may be fabricated from a plurality of optical fibre preforms by arranging the optical fibre preforms in a stack, and drawing and bonding the stack. The drawing and bonding may be by thermal fibre drawing.

The optical fibre preforms may have tileable outer cross-sectional shapes. Stacking tileable preforms may allow for reliable positioning of the cores in the multi-core optical fibre. The outer cross-sectional shapes of the optical fibre preforms are configured to allow the optical fibre preforms to be stacked together without gaps between the preforms. For example, the outer cross-sectional shapes of the optical fibre preforms may be selected from triangular, rectangular, square, and hexagonal.

The graded-index polymer optical fibre has an outer cross-sectional shape with an order of rotational symmetry of less than or equal to 4. In particular, the multi-core polymer optical fibre may have an outer cross-sectional shape with an order of rotational symmetry of 1. Providing an optical fibre with a low degree of rotational symmetry may allow for easier rotational alignment of the cores with transmitters/receivers during installation of the optical fibre.

In another aspect, the present disclosure provides a graded-index polymer optical fibre obtainable by the method. The graded-index polymer optical fibre comprises: a core having a centre, the core comprising a core polymer; cladding surrounding the core, the cladding comprising a cladding polymer; and a dopant distributed in the core and the cladding, the dopant being a compound having a refractive index which is lower than a refractive index of the core polymer. The dopant is distributed on a continuous concentration gradient, according to which concentration gradient the concentration of the dopant increasing with distance from the centre of the core.

In use, light is transmitted through the fibre. Most of the light interacts with the core, and comparatively little light interacts with the outer regions of the cladding. Dopants may contribute to optical attenuation. By distributing the dopant such that the dopant concentration is lowest at the centre of the core, the optical attenuation of the graded-index polymer optical fibre may be reduced.

The core may have a central region and an outer region surrounding the central region. The central region may consist of the core polymer. The outer region may comprise the core polymer and dopant.

The dopant may be a fluorinated or chlorinated organic molecule having a molecular weight of less than or equal to 5,000 Da, optionally less than or equal to 2,500 Da, and further optionally less than or equal to 500 Da.

The dopant may be a compound of Formula 1 as defined hereinabove.

The core polymer may be selected from polyacrylates, such as poly(methyl methacrylate); polystyrenes; polyethylenes; polycarbonates; poly(perfluorobutylene vinyl ether); and cyclic olefin copolymers.

The cladding polymer may be selected from poly(perfluoro-butenylvinyl ether), poly(fluoroalkyl methacrylate), and poly(vinylidene fluoride).

The graded-index polymer optical fibre may be a multi-core polymer optical fibre having a plurality of cores embedded in the cladding.

The multi-core polymer optical fibre may have an outer cross-sectional shape with an order of rotational symmetry of less than or equal to 4. In particular, the multi-core polymer optical fibre may have an outer cross-sectional shape with an order of rotational symmetry of 1. Providing an optical fibre with a low degree of rotational symmetry may allow for easier rotational alignment of the cores with transmitters/receivers during installation of the optical fibre.

The present disclosure provides the following Clauses:

Clause 1. A method of fabricating a graded-index polymer optical fibre, which method comprises:
preparing a cladding composition, the cladding composition comprising either a mixture of a cladding polymer and a dopant or a mixture of a cladding polymer precursor and a dopant;
forming cladding from the cladding composition around a core, the core comprising a core polymer; and
causing diffusion of the dopant into the core such that the dopant has a continuous concentration gradient, according to which concentration gradient the concentration of the dopant increases with radial distance from a centre of the core;
wherein the dopant is a compound having a refractive index which is lower than a refractive index of the core polymer.

Clause 2. The method according to Clause 1, wherein the dopant is a compound of Formula 1:

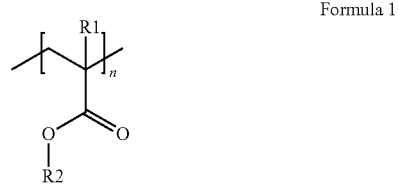

where:
n is from 1 to 20;
R1 is selected from H, unsubstituted methyl, and halomethyl;
R2 is selected from:
hydroxyl;
unsubstituted phenyl;
substituted phenyl bearing at least one substituent selected from F, Cl, unsubstituted C1 to C3 alkyl, and C1 to C3 haloalkyl;
unsubstituted C1 to C10 alkyl;
C1 to C10 haloalkyl;
C1 to C10 alkyl amine; and
C1 to C10 haloalkyl amine;
with the proviso that the dopant includes at least one F or Cl substituent.

Clause 3. The method according to Clause 1 or Clause 2, wherein, before the diffusion, the core consists of the core polymer.

Clause 4. The method according to any preceding Clause, wherein the core polymer is selected from polyacrylates, such as poly(methyl methacrylate); polystyrenes; polyethylenes; polycarbonates; poly(perfluorobutylene vinyl ether); and cyclic olefin copolymers; optionally wherein the core polymer is poly(methyl methacrylate).

Clause 5. The method according to any preceding Clause, wherein the cladding polymer is selected from poly(fluoroalkyl methacrylate) and poly(vinylidene fluoride).

Clause 6. The method according to any preceding Clause, wherein causing the diffusion of the dopant comprises heating the core and the cladding or cladding composition.

Clause 7. The method according to Clause 6, wherein causing the diffusion of the dopant comprises heating the cladding and the core, the heating being performed after forming the cladding around the core.

Clause 8. The method according to Clause 6, wherein the heating is performed during the formation of the cladding.

Clause 9. The method according to any preceding Clause, wherein forming the cladding around the core comprises co-extrusion of the core polymer and the cladding composition.

Clause 10. The method according to Clause 9, wherein the co-extrusion is continuous.

Clause 11. The method according to any of Clauses 1 to 9, wherein:
the cladding composition comprises a mixture of a cladding polymer precursor and a dopant;
forming the cladding comprises reacting the cladding polymer precursor to form a cladding polymer; and
causing the diffusion comprises contacting the mixture of the cladding polymer precursor and the dopant with the core.

Clause 12. The method according to any preceding Clause, which is a method of fabricating a multi-core graded-index polymer optical fibre.

Clause 13. The method according to any of Clauses 1 to 8, wherein forming the cladding around the core comprises forming an optical fibre preform, and wherein the method further comprises drawing the optical fibre preform.

Clause 14. The method according to Clause 13, which is a method of fabricating a multi-core graded-index polymer optical fibre and comprises forming a plurality of optical fibre preforms, arranging the optical fibre preforms in a stack, and drawing and bonding the stack.

Clause 15. The method according to Clause 14 wherein the optical fibre preforms have tileable outer cross-sectional shapes such that the stack is free of gaps between preforms.

Clause 16. The method according to any preceding Clause, wherein the graded-index polymer optical fibre has an outer cross-sectional shape with an order of rotational symmetry of less than or equal to 4.

Clause 17. A graded-index polymer optical fibre, comprising:
a core having a centre, the core comprising a core polymer;
cladding surrounding the core, the cladding comprising a cladding polymer; and
a dopant distributed in the core and the cladding, the dopant being a compound having a refractive index which is lower than a refractive index of the core polymer;
wherein the dopant is distributed on a continuous concentration gradient, according to which concentration gradient the concentration of the dopant increases with distance from the centre of the core.

Clause 18. The graded-index polymer optical fibre according to claim Clause 17, wherein the core comprises a central region and an outer region surrounding the central region, wherein the central region consists of the core polymer, and wherein the outer region comprises the core polymer and dopant.

Clause 19. The graded-index polymer optical fibre according to Clause 17 or Clause 18, wherein the dopant is a compound of Formula 1.

Clause 20. The graded-index polymer optical fibre according to any of Clauses 17 to 19, wherein the core polymer is selected from polyacrylates, such as poly(methyl methacrylate); polystyrenes; polyethylenes; polycarbonates; poly(perfluorobutylene vinyl ether); and cyclic olefin copolymers.

Clause 21. The graded-index polymer optical fibre according to any of Clauses 17 to 20, which is a multi-core polymer optical fibre having a plurality of cores embedded in the cladding.

Clause 22. The graded-index polymer optical fibre according to any of Clauses 17 to 21, having an outer cross-sectional shape with an order of rotational symmetry of less than or equal to 4.

Other variants or use cases of the disclosed techniques may become apparent to the person skilled in the art once given the disclosure herein. The scope of the disclosure is not limited by the described embodiments but only by the accompanying claims.

The invention claimed is:

1. A method comprising:
preparing a cladding precursor composition, the cladding precursor composition comprising a mixture of a cladding polymer precursor and a dopant;
forming cladding from the cladding precursor composition around a core, the core comprising a core polymer; and
causing diffusion of the dopant into the core through contact of a solution of the cladding precursor composition with the core during a wet spinning process such that a concentration of the dopant increases with radial distance from a centre of the core;
wherein the dopant is a compound having a refractive index which is lower than a refractive index of the core polymer.

2. The method according to claim 1, wherein the dopant is a compound of Formula 1:

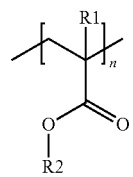

Formula 1 where:
n is from 1 to 20;
R1 is selected from H, unsubstituted methyl, and halomethyl;
R2 is selected from:
hydroxyl;
unsubstituted phenyl;
substituted phenyl bearing at least one substituent selected from F, Cl, unsubstituted C1 to C3 alkyl, and C1 to C3 haloalkyl;
unsubstituted C1 to C10 alkyl;
C1 to C10 haloalkyl;
C1 to C10 alkyl amine; and
C1 to C10 haloalkyl amine; and
with proviso that the dopant includes at least one F or Cl substituent.

3. The method according to claim 1, wherein, before the diffusion, the core consists of the core polymer.

4. The method according to claim 1, wherein the cladding formed from the cladding precursor composition comprises a polymer selected from poly (fluoroalkyl methacrylate) and poly (vinylidene fluoride).

5. The method according to claim 1, wherein causing the diffusion of the dopant comprises heating the core and the cladding or cladding precursor composition.

6. The method according to claim 1, wherein causing diffusion of the dopant comprises heating the core and the cladding precursor composition during formation of the cladding.

7. The method according to claim 1, wherein the wet spinning process is continuous.

8. The method according to claim 1, wherein forming the cladding around the core comprises forming an optical fibre preform, and wherein the method further comprises drawing the optical fibre preform.

9. The method according to claim 8, which is a method of fabricating a multi-core graded-index polymer optical fibre and comprises forming a plurality of optical fibre preforms, arranging the optical fibre preforms in a stack, and drawing and bonding the stack.

10. The method according to claim 9, wherein the optical fibre preforms have tileable outer cross-sectional shapes.

11. The method according to claim 1, which is a method of fabricating a graded-index polymer optical fibre, wherein the graded-index polymer optical fibre has an outer cross-sectional shape with an order of rotational symmetry of less than or equal to 4.

\* \* \* \* \*